(12) United States Patent
Yu et al.

(10) Patent No.: US 12,537,357 B2
(45) Date of Patent: Jan. 27, 2026

(54) OPTICAL SIGNAL AMPLIFICATION APPARATUS AND RELATED OPTICAL COMMUNICATION DEVICE

(71) Applicant: HUAWEI TECHNOLOGIES CO., LTD., Shenzhen (CN)

(72) Inventors: Yongze Yu, Dongguan (CN); Hengyun Jiang, Chengdu (CN); Bo Wu, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 305 days.

(21) Appl. No.: 18/332,892

(22) Filed: Jun. 12, 2023

(65) Prior Publication Data
US 2023/0318248 A1 Oct. 5, 2023

Related U.S. Application Data

(63) Continuation of application No. PCT/CN2021/129853, filed on Nov. 10, 2021.

(30) Foreign Application Priority Data

Dec. 30, 2020 (CN) .......................... 202011623101.6

(51) Int. Cl.
  H04B 10/291 (2013.01)
  H01S 3/067 (2006.01)
  (Continued)

(52) U.S. Cl.
  CPC ........ H01S 3/0675 (2013.01); H01S 3/06754 (2013.01); H01S 3/094003 (2013.01);
  (Continued)

(58) Field of Classification Search
  CPC ........ H04B 10/29–299; H01S 3/06754–06766
  See application file for complete search history.

(56) References Cited

U.S. PATENT DOCUMENTS 5,701,194 A   12/1997  Meli et al.
5,900,969 A   5/1999   Srivastava et al.
(Continued)

FOREIGN PATENT DOCUMENTS

CN   105720466 A   6/2016
CN   109830880 A   5/2019
(Continued)

Primary Examiner — Nathan M Cors
(74) Attorney, Agent, or Firm — Maier & Maier, PLLC

(57) ABSTRACT

An optical signal amplification apparatus and a related optical communication device. The apparatus may include a pump light source, a combiner assembly, a doped optical fiber, and an optical filter. The pump light source may be configured to emit a pump beam. The combiner assembly is configured to combine a signal beam and the pump beam and couple a combined beam into the doped optical fiber. The doped optical fiber is configured to amplify the signal beam under excitation by the pump beam. The signal beam includes one or more single-wavelength signals. The optical filter is disposed between two ends of the doped optical fiber and configured to transmit the signal beam and filter out a first beam in the doped optical fiber. The first beam includes a beam of some wavelengths or all wavelengths generated by spontaneous emission in the doped optical fiber.

14 Claims, 8 Drawing Sheets

(51) Int. Cl.
*H01S 3/094* (2006.01)
*H01S 3/16* (2006.01)
*H04B 10/25* (2013.01)
*H04B 10/50* (2013.01)
*H04B 10/564* (2013.01)

(52) U.S. Cl.
CPC ............ *H01S 3/1608* (2013.01); *H04B 10/25* (2013.01); *H04B 10/291* (2013.01); *H04B 10/503* (2013.01); *H04B 10/564* (2013.01)

(56) References Cited

U.S. PATENT DOCUMENTS

| | | | |
|---|---|---|---|
| 2001/0012147 A1* | 8/2001 | Lutz | H01S 3/10023 359/337.2 |
| 2003/0039026 A1* | 2/2003 | Nishihara | H04B 10/2941 359/337.4 |
| 2006/0127091 A1* | 6/2006 | Yoo | H04J 14/0282 398/69 |
| 2007/0041083 A1 | 2/2007 | Di Teodoro et al. | |
| 2019/0115715 A1 | 4/2019 | Hasegawa et al. | |

FOREIGN PATENT DOCUMENTS

| | | |
|---|---|---|
| CN | 209913230 U | 1/2020 |
| CN | 211238801 U | 8/2020 |
| EP | 1734622 A1 | 12/2006 |
| JP | 2001313433 A | 11/2001 |
| JP | 2006294819 A | 10/2006 |
| KR | 1020120016576 A | 2/2012 |

\* cited by examiner

OPTICAL SIGNAL AMPLIFICATION APPARATUS AND RELATED OPTICAL COMMUNICATION DEVICE

CROSS-REFERENCE TO RELATED APPLICATIONS

This application is a continuation of International Application No. PCT/CN2021/129853, filed on Nov. 10, 2021, which claims priority to Chinese Patent Application No. 202011623101.6, filed on Dec. 30, 2020. The disclosures of the aforementioned applications are hereby incorporated by reference in their entireties.

TECHNICAL FIELD

The embodiments relate to the field of optical communication technologies, an optical signal amplification apparatus, and a related optical communication device.

BACKGROUND

In an optical communication network, an optical signal is attenuated in a transmission process. In an optical transmission line, an optical signal amplification apparatus may be required to amplify power of the optical signal. For example, a conventional optical fiber amplifier, a semiconductor optical amplifier, or a doped optical fiber amplifier may be used to amplify an optical signal. A basic principle of amplifying an optical signal by a doped optical fiber amplifier is that rare earth particles in a ground state in a doped optical fiber may transfer to a metastable state under the action of a pump light source, and then stimulated emission occurs in the rare earth particles in the metastable state under excitation by the optical signal. The rare earth particles in the metastable state transit to the ground state under the excitation of the optical signal, and photons that are the same as photons of the optical signal (for example, in a same direction, a same wavelength, and a same phase) are released, so as to amplify the optical signal.

However, in the doped optical fiber, in addition to the stimulated emission excited by the optical signal, the rare earth particles in the metastable state may perform spontaneous emission. The rare earth particles in the metastable state may spontaneously transit from the metastable state to a steady state, and photons with random directions, wavelengths, and phases are released. The spontaneous emission consumes a quantity of the rare earth particles in the metastable state, so that the metastable particles in which stimulated emission occurs under the excitation by the optical signal are reduced. In addition, when noise light formed by these photons is transmitted in the doped optical fiber, the rare earth particles in the metastable state are induced to transit to the ground state, and photons that are the same as photons of the noise light are released. In other words, the noise lights are amplified, which is also referred to as amplified spontaneous emission (ASE). By the same principle, the amplified noise lights will be further amplified, and consume more metastable-state rare earth particles. Therefore, factors in the foregoing two aspects both consume the rare earth particles in the metastable state in the doped optical fiber, so that a proportion of the metastable-state rare earth particles that amplify signal lights is reduced, and pumping efficiency of the pump light source is affected.

SUMMARY

The embodiments may provide an optical signal amplification apparatus and a related optical communication device. Pumping efficiency of a pump light source and amplification efficiency for a signal beam can be improved.

A first aspect may provide an optical signal amplification apparatus. The apparatus may include a pump light source, a combiner assembly, a doped optical fiber, and an optical filter.

The pump light source may be configured to emit a pump beam. The combiner assembly is configured to combine a signal beam and the pump beam that are received and couple a combined beam into the doped optical fiber. The doped optical fiber is configured to amplify the signal beam under excitation by the pump beam. The signal beam includes one or more single-wavelength signals. The optical filter is disposed between two ends of the doped optical fiber. The optical filter is configured to transmit the signal beam in the doped optical fiber and is configured to filter out a first beam in the doped optical fiber. The first beam includes a beam of some wavelengths or a beam of all wavelengths generated by spontaneous emission in the doped optical fiber.

The first beam may include a beam of some or all wavelengths generated by the spontaneous emission of rare earth particles at a high energy level in the doped optical fiber that spontaneously transit to a low energy level. The first beam may further include a beam of some or all wavelengths generated by stimulated emission (that is, amplified spontaneous emission) of the rare earth particles at the high energy level in the doped optical fiber that transit to the low energy level under excitation by the beam generated by the spontaneous emission. In other words, the first beam may include a beam of some wavelengths or all wavelengths generated by the spontaneous emission in the doped optical fiber, and may further include a beam of some wavelengths or all wavelengths generated by amplified spontaneous emission.

In the optical signal amplification apparatus, the optical filter may transmit the signal beam in the doped optical fiber, to ensure normal transmission of the signal beam. In addition, the optical filter may filter out the first beam in the doped optical fiber, reduce stimulated emission further induced by the first beam in the doped optical fiber, and suppress amplified spontaneous emission. In this way, consumption of the amplified spontaneous emission on the rare earth particles at the high energy level in the doped optical fiber is reduced, utilization efficiency of the signal beam to the high energy level rare earth particles is improved, and pumping efficiency of the pump light source and amplification efficiency for the signal beam are improved.

With reference to the first aspect, in an alternative implementation, the optical filter is a long-period fiber grating inscribed at any position between the two ends of the doped optical fiber. The long-period fiber grating is a transmission-type band-stop filter with a grating period greater than 1 micrometer.

With reference to the first aspect, in another alternative implementation, the optical signal amplification apparatus includes a plurality of optical filters disposed at different positions between the two ends of the doped optical fiber. Each of the optical filters may be configured to filter out the first beam input into the optical filter. It should be understood that each of the optical filters may have a same function, but a beam actually filtered out by each of the filters may be the first beam generated by different parts of the doped optical fiber.

With reference to the first aspect, in another alternative implementation, the doped optical fiber includes a first optical fiber and a second optical fiber that are respectively located on two sides of the optical filter. In an implementation, the optical filter may be configured to filter out a part of beam in the first beam that is transmitted from the first optical fiber to the second optical fiber. In another implementation, the optical filter may be configured to filter out a part of beam in the first beam that is transmitted from the second optical fiber to the first optical fiber. In still another implementation, the optical filter may be configured to filter out a part of beam in the first beam and that is transmitted from the first optical fiber to the second optical fiber, and is configured to filter out a part of beam in the first beam that is transmitted from the second optical fiber to the first optical fiber.

With reference to the first aspect, in another alternative implementation, the doped optical fiber is an erbium-doped fiber. A stopband frequency of the optical filter includes a frequency of a beam with a wavelength of 1530 nm.

With reference to the first aspect, in another alternative implementation, the signal beam includes at least a beam with a wavelength of 1490 nm and a beam with a wavelength of 1577 nm. An inversion rate of erbium ions in the erbium-doped fiber is greater than 70%.

With reference to the first aspect, in still another alternative implementation, the apparatus includes a plurality of doped optical fibers connected in parallel, and an optical filter disposed between two ends of each of the doped optical fibers. The combiner assembly includes a dichroscope. The apparatus further includes an optical splitter and a plurality of collimation lenses. The optical splitter is configured to split the pump beam to obtain a plurality of split pump beams. Each of the plurality of collimation lenses is configured to collimate and transmit one pump beam of the plurality of split pump beams to the dichroscope. The dichroscope is configured to receive a plurality of signal beams and the plurality of split pump beams passing through the plurality of collimation lenses, is further configured to combine different pump beams of the plurality of pump beams with different signal beams of the plurality of signal beams and is further configured to input different beams after the combination into the different doped optical fibers. Highly efficient amplification of the plurality of signal beams can be implemented at the same time.

A second aspect may provide an optical communication device. The device includes an electrical signal processing apparatus, a laser emitting apparatus, a beam splitting/combining apparatus, an optical signal amplification apparatus, and a first optical fiber connection apparatus.

The electrical signal processing apparatus is configured to generate a first electrical signal. The first electrical signal carries first service information. The laser emitting apparatus is configured to emit a plurality of single-wavelength beams of different wavelengths based on the first electrical signal. Each of the single-wavelength beams carries a part or all of service information in the first service information. The beam splitting/combining apparatus is configured to combine the plurality of single-wavelength beams of different wavelengths into a signal beam. The optical signal amplification apparatus may be the optical signal amplification apparatus provided in the first aspect and may be configured to amplify the signal beam. The first optical fiber connection apparatus is configured to output the signal beam amplified by the optical signal amplification apparatus.

BRIEF DESCRIPTION OF THE DRAWINGS

To describe the embodiments more clearly, the following briefly describes the accompanying drawings. It is clear that the accompanying drawings in the following description show merely some embodiments and persons of ordinary skill in the art may derive other drawings from these accompanying drawings without creative efforts.

DETAILED DESCRIPTION OF THE EMBODIMENTS

Figure 1:
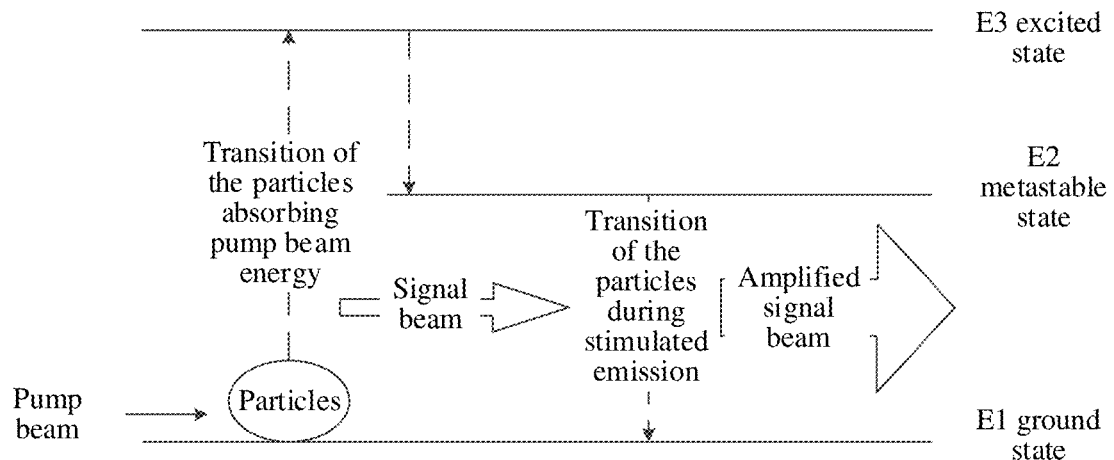
FIG. 1 is a schematic diagram of energy level transition of erbium ions according to an embodiment.

The following clearly describes the embodiments with reference to the accompanying drawings. It is clear that the described embodiments are some rather than all of the embodiments. All other embodiments obtained by persons of ordinary skill in the art without creative efforts shall fall within the scope of the embodiments.

First, concepts and basic principles that may be involved in an optical signal amplification apparatus provided in the embodiments are briefly described.

1. Spontaneous Emission

Spontaneous emission is a process in which particles spontaneously transit from a high energy level (such as an excited state or a metastable state) to a low energy level (such as a ground state) without any external action and emits photons. In the spontaneous emission, the particles are independent of each other in a spontaneous transition process. Spontaneous emission light generated by different particles is arbitrary in frequency, phase, polarization direction, and propagation direction.

2. Stimulated Emission

Stimulated emission is a process in which particles at a high energy level (such as an excited state or a metastable state) transit to a low energy level (such as a ground state) under the action of an external radiation field and emits photons. A frequency, a phase, a polarization direction, and a propagation direction of the photons emitted by the stimulated emission are the same as those of external photons.

3. Amplified Spontaneous Emission

Amplified spontaneous emission is a process in which particles transit from a high energy level (such as an excited state or a metastable state) to a low energy level (such as a ground state) under the action of photons generated by spontaneous emission and emits photons that are exactly the same as the photons generated by the spontaneous emission. In other words, under the action of the photons generated by the spontaneous emission, stimulated emission occurs in the particles, and the spontaneous emission is amplified.

4. Population Inversion and Inversion Rate of Particles

A quantity of particles at each energy level in a substance in a thermal equilibrium state complies with Boltzmann distribution. That is, a higher energy level indicates fewer particles. Under a condition, such as external pumping or excitation, the particles absorb energy and transit to a high energy level. When a quantity of atoms at a high energy level is greater than a quantity of particles at a low energy level, it is referred to as population inversion.

An inversion rate of particles may be a ratio of a quantity of particles at a high energy level in substance to a total quantity of the particles of the type included in the substance. For example, an inversion rate of erbium ions in an erbium-doped fiber is a ratio of a quantity of particles at a high energy level in the erbium-doped fiber to a total quantity of erbium ions in the erbium-doped fiber.

5. Principle of Amplifying Light by a Doped Optical Fiber Amplifier

When rare earth particles in the doped optical fiber amplifier receive energy and are at a high energy level, stimulated emission of light is generated. If a condition for continuous stimulated emission is met, and an input signal beam is used for sensing, a signal beam with stronger strength can be output, thereby achieving amplification.

FIG. 1 is a schematic diagram of energy level transition of erbium ions according to an embodiment. With reference to FIG. 1, an erbium-doped fiber amplifier (EDFA) is used as an example to describe in detail a principle of amplifying light by a doped optical fiber. In the erbium-doped fiber amplifier, most erbium ions in the erbium-doped fiber are in an E1 ground state. As shown in FIG. 1, after a pump beam with sufficient strength is injected into the erbium-doped fiber, the erbium ions in the E1 ground state can be pumped to an E3 excited state. However, the erbium ions in the E3 excited state have a short energy level life, and quickly transfer to an E2 metastable state without emission. Because the erbium ions have a long energy level life in the E2 metastable state, it is easy to form population inversion between the E2 metastable state and the E1 ground state. After being input into the erbium-doped fiber, the signal beam acts on the erbium ions and stimulated emission occurs, to generate a large quantity of photons that are the same as those of the signal beam. In this way, the photons of the signal beam in the erbium-doped fiber increase rapidly, thereby amplifying a signal.

The optical signal amplification apparatus provided in the embodiments may be applied to a trunk link for transmitting an optical signal and perform gain compensation on the optical signal in a relay process of the optical signal. The optical signal amplification apparatus may alternatively be applied to any optical communication device, for example, an optical line terminal (OLT) device. Further, the optical signal amplification apparatus provided in the embodiments may be applied to an OLT device in a combined (Combo) PON system that is based on an onboard integration technology. For example, the Combo PON system may be an integrated system of a GPON system and an XGPON system. For example, the OLT device may be deployed in a central equipment room of the Combo PON system. The OLT device may receive a downlink electrical signal from an aggregation switch, convert the downlink electrical signal into an optical signal, and transmit the optical signal to a downstream optical network of the Combo PON system. For another example, the OLT device may be deployed at an edge end of the Combo PON system (for example, deployed in a corridor of a user). The OLT device may receive a downlink optical signal from an upstream optical network, convert the downlink optical signal into an electrical signal, and then perform electrical signal processing to convert the electrical signal into a downlink optical signal, and transmit the converted downlink optical signal to a downstream optical network or a downstream optical device.

Figure 2:
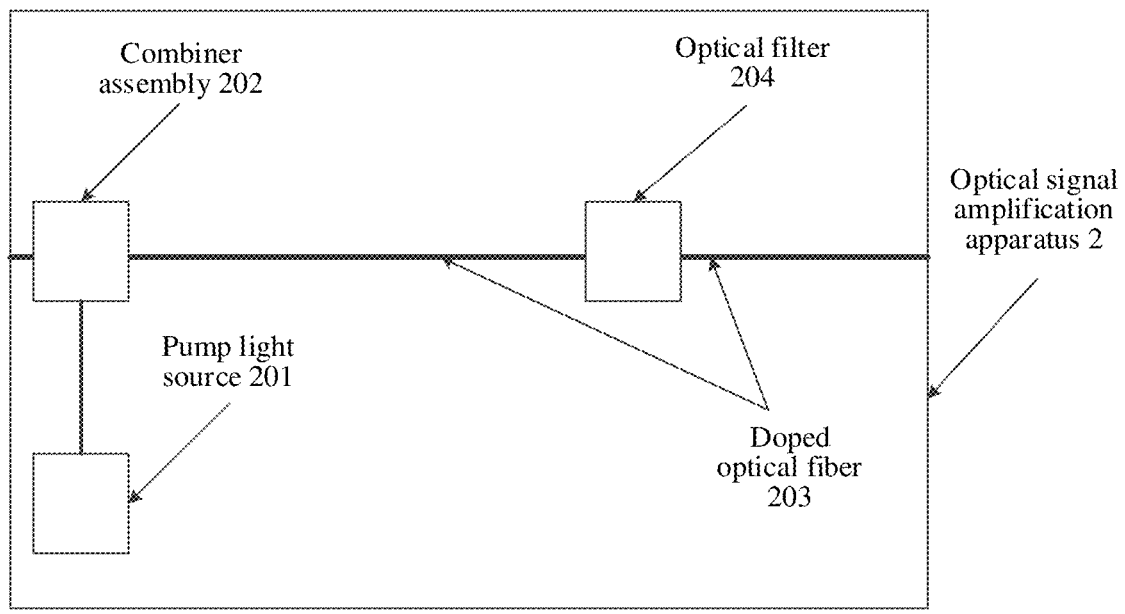
FIG. 2 is a schematic diagram of a structure of an optical signal amplification apparatus according to an embodiment.

The following describes an optical signal amplification apparatus provided in the embodiments with reference to FIG. 2 to FIG. 7c. FIG. 2 is a schematic diagram of a structure of an optical signal amplification apparatus according to an embodiment. As shown in FIG. 2, the optical signal amplification apparatus 2 includes at least a pump light source 201, a combiner assembly 202, a doped optical fiber 203, and an optical filter 204. It should be understood that the optical signal amplification apparatus 2 may further include other components, such as a signal beam input port, a signal beam output port, and an optical fiber connecting two components.

The pump light source 201 is configured to emit a pump beam. The combiner assembly 202 is configured to combine a signal beam and the pump beam that are received and couple a combined beam into the doped optical fiber 203. The doped optical fiber 203 is configured to amplify the signal beam under excitation by the pump beam. The optical filter 204 is disposed between two ends of the doped optical fiber 203. The optical filter 204 is configured to transmit the signal beam in the doped optical fiber and is configured to filter out a first beam in the doped optical fiber 203. The signal beam includes one or more single-wavelength signals. The first beam includes a beam of some wavelengths or a beam of all wavelengths generated by a beam generated by spontaneous emission in the doped optical fiber 203.

In the foregoing optical signal amplification apparatus 2, the optical filter 204 may transmit the signal beam in the doped optical fiber, to ensure normal transmission of the signal beam. In addition, the optical filter may filter out the first beam in the doped optical fiber, reduce stimulated emission further induced by the first beam in the doped optical fiber, and suppress amplified spontaneous emission. In this way, consumption of the amplified spontaneous emission on rare earth particles at a high energy level in the doped optical fiber is reduced, utilization efficiency of the signal beam to the high energy level rare earth particles is improved, and pumping efficiency of the pump light source and amplification efficiency for the signal beam are improved.

The first beam includes a beam of some wavelengths or all wavelengths generated by the spontaneous emission in the doped optical fiber 203. The first beam may include a beam of some or all wavelengths generated by spontaneous emission of rare earth particles at a high energy level in the doped optical fiber 203 that spontaneously transition to a low energy level. The first beam may further include a beam of some or all wavelengths generated by stimulated emission (that is, amplified spontaneous emission) of the rare earth particles at the high energy level in the doped optical fiber 203 that transit to the low energy level under excitation by the beam generated by the spontaneous emission. In other words, the first beam may include a beam of some wavelengths or all wavelengths generated by the spontaneous emission in the doped optical fiber 203 and may further include a beam of some wavelengths or all wavelengths generated by amplified spontaneous emission.

Because a wavelength of a beam generated by the spontaneous emission in the doped optical fiber 203 is random, a wavelength of the first beam may include some wavelengths of the beam generated by the spontaneous emission and may alternatively include all wavelengths of the beam generated by the spontaneous emission. An effect of amplifying a beam by the doped optical fiber 203 may be represented by a gain spectrum of the doped optical fiber 203. The gain spectrum of the doped optical fiber 203 may reflect a capability of the doped optical fiber to amplify beams of different wavelengths, which is described with reference to FIG. 3 as an example.

Figure 3:
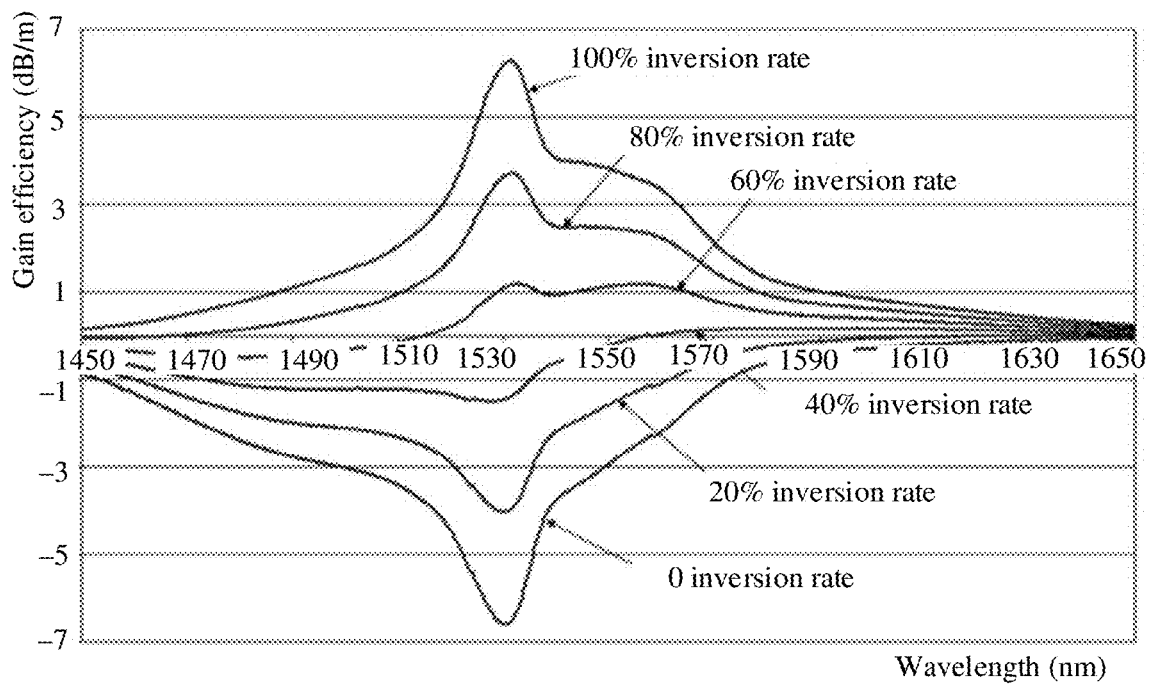
FIG. 3 is a schematic diagram of a gain spectrum of an erbium-doped fiber according to an embodiment.

FIG. 3 is a schematic diagram of a gain spectrum of an erbium-doped fiber according to an embodiment. As shown in FIG. 3, gain efficiency of the erbium-doped fiber for beams of different wavelengths may be positive, negative, or zero, indicating that the erbium-doped fiber has different amplification capabilities for the beams of different wavelengths. Positive gain efficiency indicates that the erbium-doped fiber has an amplification capability for a beam, and non-positive gain efficiency indicates that the erbium-doped fiber has no amplification capability for the beam. Further, in FIG. 3, gain efficiency of the erbium-doped fiber for beams of same wavelength may be positive, negative, or zero under different inversion rates of erbium ions. This indicates that the inversion rate of the erbium ions in the erbium-doped fiber affects the capability of the erbium-doped fiber to amplify the beams of same wavelength. However, the inversion rate of the erbium ions in the erbium-doped fiber is restricted by spontaneous emission or amplified spontaneous emission. Reducing the amplified spontaneous emission in the erbium-doped fiber can improve the inversion rate of the erbium ions and improve the capability of the erbium-doped fiber to amplify a signal beam.

The doped optical fiber 203 may amplify a beam of a wavelength with positive gain efficiency in the gain spectrum of the doped optical fiber. Therefore, a signal beam in the optical signal amplification apparatus provided in the embodiments includes one or more single-wavelength beams. Gain efficiency of each of the single-wavelength beams in the gain spectrum of the doped optical fiber 203 is positive. The single-wavelength beam may be a beam with a wavelength in a single and discrete value. For example, a beam with a wavelength of 1490 nm is a single-wavelength beam, and a beam with a wavelength of 1577 nm is also a single-wavelength beam. In an implementation, the signal beam may be a beam input from the signal beam input port of the optical signal amplification apparatus 2, may be a beam transmitted by an upstream optical network device, and may alternatively be a beam generated by a local optical network device. Further, the signal beam may carry first service information.

For example, the signal beam may be a downlink optical signal (which may have a wavelength of 1490 nm) of a gigabit-capable passive optical network (GPON) system. For another example, the signal beam may be a downlink optical signal (which may have a wavelength of 1577 nm) of a ten gigabit-capable passive optical network (XGPON)) system. For another example, the signal beam may include both the downlink optical signal of the GPON system and the downlink optical signal of the XGPON system. For another example, the signal beam may include an uplink optical signal (which may have a wavelength of 1310 nm) of the GPON system, and/or an uplink optical signal (which may have a wavelength of 1270 nm) of the XGPON system. For another example, the signal beam may include the uplink optical signal and the downlink optical signal of the GPON system, and the uplink optical signal and the downlink optical signal of the XGPON system.

It may be understood that, in a case in which the signal beam includes a plurality of single-wavelength beams, gain efficiency of each of the single-wavelength beams in the signal beams in the doped optical fiber 203 needs to be positive at the same time, so that each of the single-wavelength beam in the signal beam can be amplified simultaneously.

For example, if the signal beam includes both the downlink optical signal of the GPON system and the downlink optical signal of the XGPON system, both gain efficiency of the doped optical fiber 203 for the beam of 1490 nm wavelength and gain efficiency of the doped optical fiber for the beam of 1577 nm wavelength need to be greater than zero. If the doped optical fiber 203 is an erbium-doped fiber, it is not difficult to see according to the gain spectrum of the erbium-doped fiber shown in FIG. 3 that when the inversion rate of the erbium ions in the erbium-doped fiber is greater than 70%, the erbium-doped fiber can amplify both the beam of 1490 nm wavelength and the beam of 1577 nm wavelength. To improve the inversion rate of the erbium ions in the erbium-doped fiber, a beam of some wavelengths or a beam of all wavelengths generated by the spontaneous emission or the amplified spontaneous emission in the erbium-doped fiber may be filtered out. Wavelengths of the beams generated by the spontaneous emission or the amplified spontaneous emission in the erbium-doped fiber may be around 1530 nm (that is, beams in a C band, in which wavelengths corresponding to the C band includes wavelengths of 1528 nm to 1562 nm). A stopband frequency of the optical filter 204 may include a frequency corresponding to a beam with a wavelength of 1530 nm, and the beam with a wavelength of 1530 nm is filtered out. Further, the stopband frequency of the optical filter 204 may include frequencies corresponding to a beam with a wavelength from 1490 nm to 1577 nm (excluding two ends). Some beams or all beams with a wavelength between 1490 nm and 1577 nm may be filtered out, so as to suppress consumption of high energy level erbium ions in the erbium-doped fiber by the amplified spontaneous emission.

For example, the pump light source 201 may be a single-mode pump light source or a multimode pump light source. A pump beam emitted by the pump light source 201 may be a beam with a wavelength of 974 nm or a beam with a wavelength of 1480 n, and may alternatively be a beam with another wavelength. In an example, a wavelength of a pump beam emitted by the pump light source 201 is less than a wavelength of the signal beam.

For example, the combiner assembly 202 may be a component such as an optical coupler, an optical multiplexer, or a dichroscope, and may combine beams of two different wavelengths: the signal beam and the pump beam and couple a combined beam into the doped optical fiber 203 for transmission.

For example, the doped optical fiber 203 may be an optical fiber doped with rare earth particles. For example, the doped optical fiber may be an erbium-doped fiber doped with erbium (Er) ions, may be an ytterbium-doped fiber doped with ytterbium (Yb) ions, may be a praseodymium-doped fiber doped with praseodymium (Pr) ions, or may be a thulium-doped fiber doped with thulium (Tm) ions. The doped optical fiber 203 may alternatively be an optical fiber co-doped with multiple rare earth particles, for example, an erbium ytterbium co-doped fiber.

For example, the optical filter 204 may be a band-stop filter. A stopband frequency of the band-stop filter includes a frequency of a first beam. Alternatively, the optical filter 204 may be a band-pass filter. A passband frequency of the band-pass filter includes a frequency of the signal beam and a frequency of the pump beam. Further, if the optical filter 204 is a band-pass filter, and another wanted optical signal may further pass through, the passband frequency of the band-pass filter further includes a frequency of the wanted optical signal. For example, in the optical filter 204, an optical signal, such as a monitoring optical signal or an alarm optical signal, generated inside the optical signal amplification apparatus 2 may pass through. The passband frequency of the passband filter further includes a frequency of the optical signal generated inside.

Figure 4:
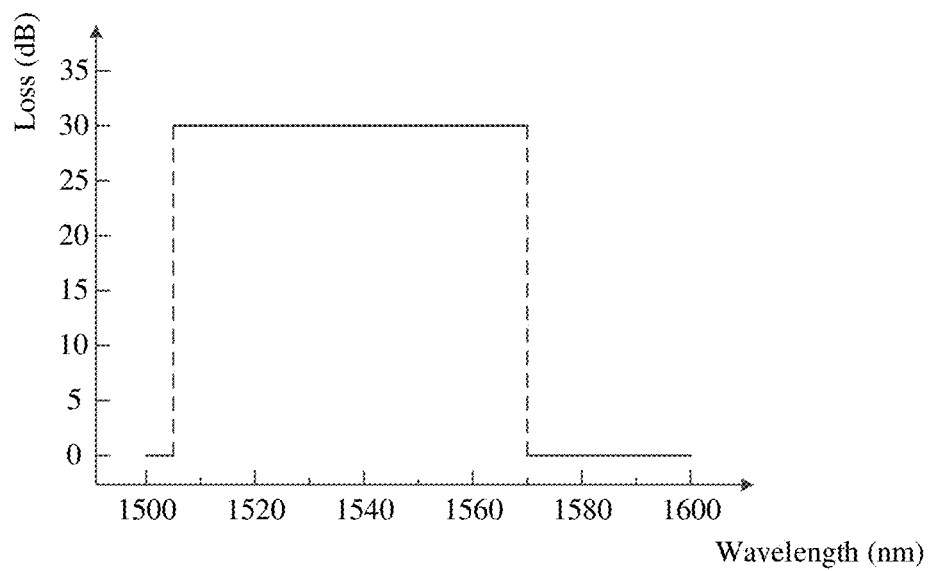
FIG. 4 is a schematic diagram of a filtering spectrum of a long-period fiber grating according to an embodiment.

The optical filter 204 may be a thin film optical filter, a long-period fiber grating (LPFG), a tunable optical filter (TOF), or the like. The thin film optical filter is a filter that performs filtering based on thin film interference. The long-period fiber grating is a transmission-type band-stop filter with a grating period greater than 1 micrometer. The tunable optical filter is an optical filter with a tunable filtering wavelength, for example, a tunable optical filter that can adjust a filtering wavelength based on a temperature. In an implementation, the doped optical fiber 203 may be an erbium-doped fiber. First beams generated by the spontaneous emission and the amplified spontaneous emission in the erbium-doped fiber include beams with wavelengths around 1530 nm. The optical filter 204 may be a long-period fiber grating. A filtering spectrum of the optical filter may be shown in FIG. 4. FIG. 4 is a schematic diagram of a filtering spectrum of a long-period fiber grating according to an embodiment. As shown in FIG. 4, the long-period fiber grating is a band-stop filter and can filter out a beam with a wavelength around 1530 nm.

Further, a pumping function of the pump light source 201 on the doped optical fiber may be a forward pumping function, a reverse pumping function, or a bidirectional pumping function. In the forward pumping function, a transmission direction of the pump beam in the doped optical fiber 203 is consistent with a transmission direction of the signal beam in the doped optical fiber 203. In the reverse pumping function, the transmission direction of the pump beam in the doped optical fiber 203 is opposite to the transmission direction of the signal beam in the doped optical fiber 203. In the bidirectional pumping function, the pump beam in the doped optical fiber 203 includes a pump beam in a transmission direction consistent with the signal beam, and a pump beam in a transmission direction opposite to the signal beam.

Figure 5A:
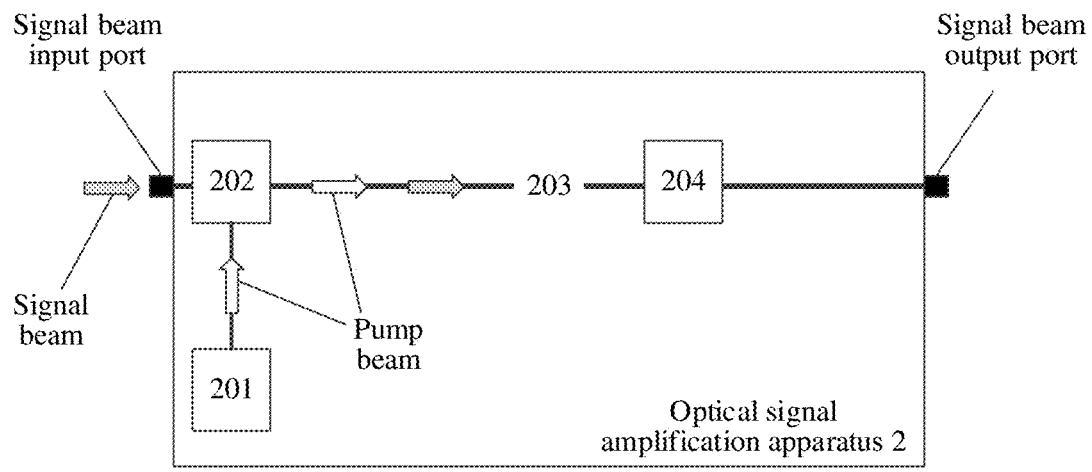
FIG. 5a is a schematic diagram of pumping of an optical signal amplification apparatus according to an embodiment.

Therefore, the combiner assembly 202 and the doped optical fiber 203 may be connected in multiple alternative manners:

In an alternative connection manner, the pump light source implements a forward pumping function. FIG. 5a is a schematic diagram of pumping of an optical signal amplification apparatus according to an embodiment. As shown in FIG. 5a, the combiner assembly 202 may be located near the signal beam input port. For example, the combiner assembly may be connected between the signal beam input port and the doped optical fiber 203 by a non-doped optical fiber. For another example, the doped optical fiber 203 is directly connected to the signal beam input port, and the combiner assembly 202 may be connected to an end of the doped optical fiber 203 that is close to the signal beam input port of the (as shown in FIG. 5a). In this way, the combiner assembly 202 may transmit a pump beam emitted by the pump light source 201 to the signal beam output port, so as to implement the forward pumping function.

Figure 5B:
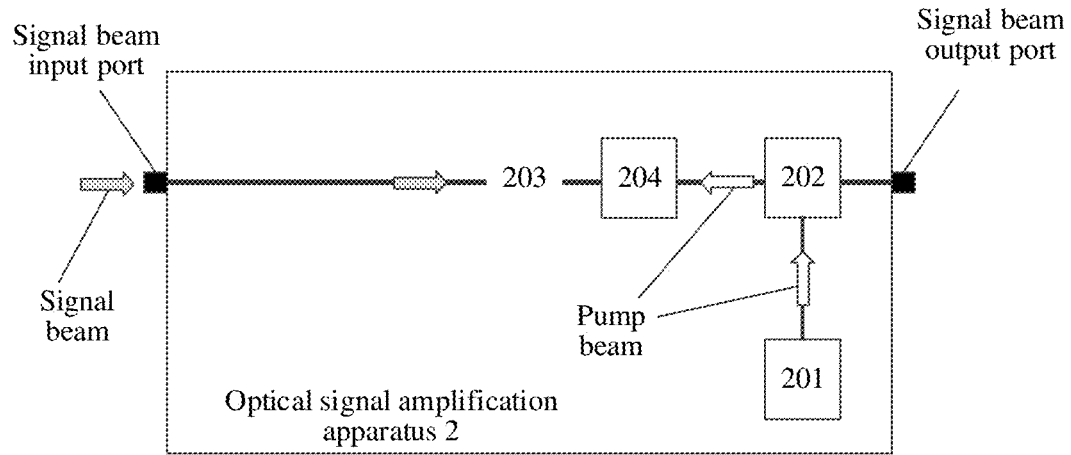
FIG. 5b is a schematic diagram of another pumping of an optical signal amplification apparatus according to an embodiment.

In another alternative connection manner, the pump light source implements a reverse pumping function. FIG. 5b is a schematic diagram of another pumping of an optical signal amplification apparatus according to an embodiment. As shown in FIG. 5b, the combiner assembly 202 may be located near the signal beam output port. For example, the combiner assembly may be connected between the doped optical fiber 203 and the signal beam output port by a non-doped optical fiber. For another example, the doped optical fiber 203 is directly connected to the signal beam output port, and the combiner assembly 202 may be connected to an end of the doped optical fiber 203 that is close to the signal beam output port (as shown in FIG. 5b). In this way, the combiner assembly 202 may transmit a pump beam emitted by the pump light source 201 to the signal beam input port, to implement the reverse pumping function.

Figure 5C:
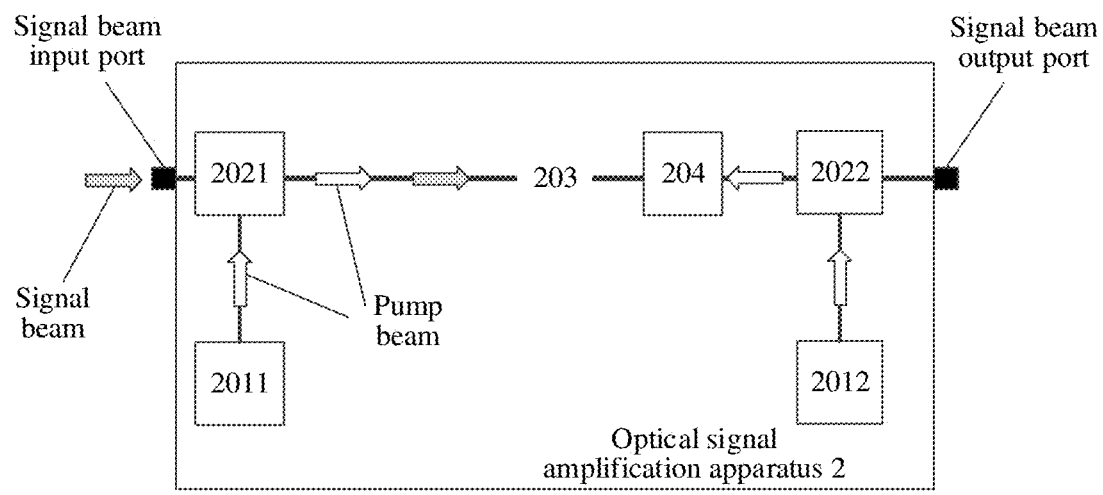
FIG. 5c is a schematic diagram of still another pumping of an optical signal amplification apparatus according to an embodiment.

In still another alternative connection manner, the pump light source implements a bidirectional pumping function. FIG. 5c is a schematic diagram of still another pumping of an optical signal amplification apparatus according to an embodiment. As shown in FIG. 5c, there may be two combiner assemblies: a combiner assembly 2021 and a combiner assembly 2022, which are respectively located at positions near the signal beam input port and near the signal beam output port. There may be one pump light source, and an emitted pump beam may be incident to the combiner assembly 2021 and the combiner assembly 2022 respectively by an optical splitter component. There may alternatively be two pump light sources. As shown in FIG. 5c, the pump light sources include a pump light source 2011 and a pump light source 2012. The combiner assembly 2021 may couple a pump beam emitted by the pump light source 2011 to the doped optical fiber 203. The combiner assembly 2022 may couple a pump beam emitted by the pump light source 2012 to the doped optical fiber 203. In this way, the combiner assembly 2021 may transmit a received pump beam to the signal beam output port direction, and the combiner assembly 2022 may transmit a received pump beam to the signal beam input port direction, so as to implement the bidirectional pumping function.

The doped optical fiber 203 includes two ends along an axial direction. In an implementation, the ends of the doped optical fiber 203 may refer to two end surfaces of the doped optical fiber 203 along the axial direction. In this implementation, the doped optical fiber 203 may be connected to another component, for example, the signal beam input port, in a contact manner, or may be connected to another component, for example, the signal beam input port, in a non-contact manner. In still another implementation, the end of the doped optical fiber 203 may be an optical fiber that has a length along the axial direction at a tail end of the doped optical fiber 203. In this implementation, the doped optical fiber 203 may be connected to another component, for example, a signal beam input port, in an embedded manner. The optical fiber at the end of the doped optical fiber 203 may be embedded into the signal beam input port, to implement a connection to the signal beam input port.

The optical filter 204 may be located between the two ends of the doped optical fiber 203 and may be located at a position of a non-end of the doped optical fiber 203. The optical filter 204 may be disposed in different manners based on different types. For example, when the optical filter 204 is a filter that may be disposed outside the doped optical fiber 203, such as a thin film optical filter or a tunable optical filter, the doped optical fiber 203 may be divided into two segments by the optical filter 204 disposed at the middle of the doped optical fiber. The two segments of doped optical fibers are respectively connected to two ends of the optical filter 204 and are respectively configured to input a beam to the optical filter 204 and receive a beam output by the optical filter 204. For another example, when the optical filter 204 is a filter that may be disposed inside the doped optical fiber 203, such as a long-period fiber grating, the optical filter 204 may be disposed at any position inside the doped optical fiber 203 and between the two ends. For example, the optical filter 204 is a long-period fiber grating that is inscribed at any position inside the doped optical fiber 203 and between the two ends.

In an implementation, the optical filter 204 is disposed between the two ends of the doped optical fiber 203. The doped optical fiber 203 includes a first optical fiber and a second optical fiber that are respectively located on two sides of the optical filter 204. It is not difficult to understand that, due to randomness of a transmission direction of photons generated by spontaneous emission, a first beam generated by spontaneous emission in the first optical fiber may include a part of beam transmitted from the first optical fiber to the second optical fiber, or may include a part of beam transmitted from the second optical fiber to the second optical fiber. Therefore, further, the optical filter 204 may be configured to filter out the part of beam in the first beam that is transmitted from the first optical fiber to the second optical fiber. Alternatively, the optical filter 204 is configured to filter out the part of beam in the first beam that is transmitted from the second optical fiber to the first optical fiber. Alternatively, the optical filter 204 may be configured to filter out both the part of beam in the first beam that is transmitted from the first optical fiber to the second optical fiber and the part of beam in the first beam that is transmitted from the second optical fiber to the first optical fiber.

Figure 6:
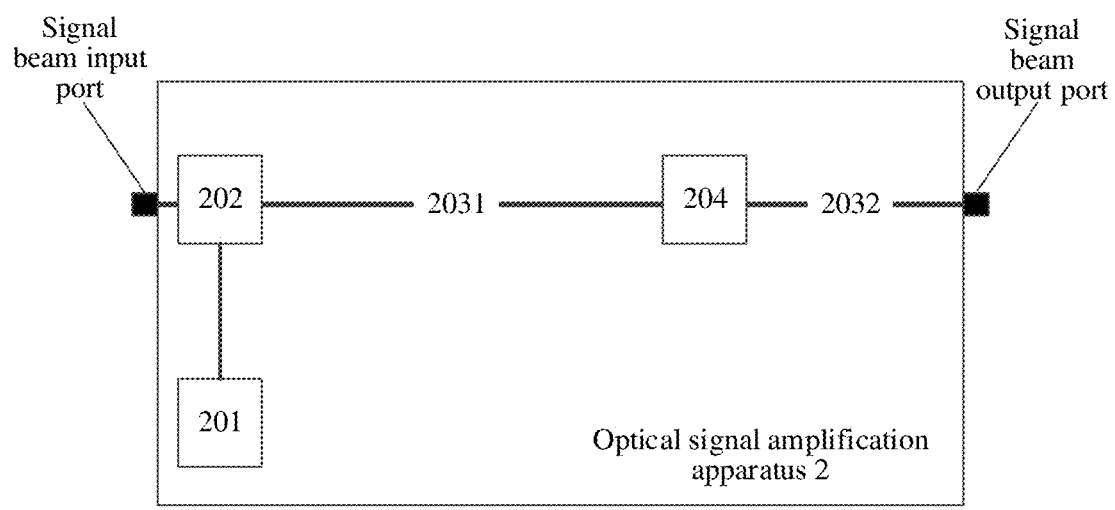
FIG. 6 is a schematic diagram of an optical signal amplification apparatus according to an embodiment.

FIG. 6 is a schematic diagram of an optical signal amplification apparatus according to an embodiment. As shown in FIG. 6, the doped optical fiber 203 includes an optical fiber 2031 located on a side that is of the optical filter 204 and that is close to the signal beam input port, and an optical fiber 2032 located on a side that is of the optical filter 204 and that is close to the signal beam output port. The optical filter 204 may filter out a part of beam in a first beam that is transmitted from the optical fiber 2031 to the optical fiber 2032, so as to implement forward filtering for the first beam. The optical filter 204 may alternatively filter out a part of beam in the first beam that is transmitted from the optical fiber 2032 to the optical fiber 2031, so as to implement reverse filtering for the first beam. The optical filter 204 may alternatively filter out a part of beam in the first beam that is transmitted from the optical fiber 2031 to the optical fiber 2032 and a part of beam in the first beam that is transmitted from the optical fiber 2032 to the optical fiber 2031, so as to implement bidirectional filtering for the first beam.

The optical signal amplification apparatus 2 may include a plurality of optical filters 204, which are respectively disposed at different positions between two ends of the doped optical fiber 203. Each of the optical filters 204 in the optical signal amplification apparatus 2 may be configured to filter out the first beam input into the optical filter 204, so as to suppress consumption of rare earth particles at a high energy level by spontaneous emission and amplified spontaneous emission.

It should be understood that the optical filters 204 in the optical signal amplification apparatus 2 may have a same function, but a beam actually filtered out by each of the optical filters 204 may be a first beam generated by different parts of the doped optical fiber 203. For example, if different optical filters 204 are respectively disposed at two different positions between the two ends of the doped optical fiber 203, filters at the two positions are a filter 1 and a filter 2. The doped optical fiber 203 includes an optical fiber 2 located between the filter 1 and the filter 2, an optical fiber 1 located at a side of the filter 1 away from the optical fiber 2, and an optical fiber 3 located at a side of the filter 2 away from the optical fiber 2. Both the filter 1 and the filter 2 can implement the forward filtering (in which it is assumed that a forward direction is a direction from the optical fiber 1 to the optical fiber 3). In this case, the filter 1 may filter out a first beam of some or all wavelengths generated by the optical fiber 1 due to the spontaneous emission. The filter 2 may filter out a first beam of some or all wavelengths generated by the optical fiber 2 due to the spontaneous emission. It should be understood that, if a part of the first beam generated by the optical fiber 1 is not completely filtered out by the filter 1, the part of the first beam may also be filtered out by the filter 2.

In a case in which the optical signal amplification apparatus 2 includes only one optical filter 204, the doped optical fiber 203 may include a first optical fiber and a second optical fiber that are respectively located on two sides of the optical filter 204. If the optical filter 204 can filter out a first beam transmitted from the first optical fiber to the second optical fiber, by a filtering function of the optical filter 204, the first beam transmitted from the first optical fiber to the second optical fiber is filtered out. Therefore, the first beam in the first optical fiber is not input to the second optical fiber and is not amplified in the second optical fiber. In this way, consumption of the high energy level rare earth particles in the doped optical fiber by the spontaneous emission or the amplified spontaneous emission can be reduced. Correspondingly, if the optical filter 204 can filter out the first beam transmitted from the second optical fiber to the first optical fiber, the first beam in the second optical fiber is neither input to the first optical fiber nor amplified in the first optical fiber. In this way, consumption of the high energy level rare earth particles in the doped optical fiber by the spontaneous emission or the amplified spontaneous emission can be reduced. If the optical filter 204 can bidirectionally filter out the first beam transmitted from the first optical fiber to the second optical fiber and the first beam transmitted from the second optical fiber to the first optical fiber, the first beam in the first optical fiber is not input to the second optical fiber for amplification, and the first beam in the second optical fiber is not input to the first optical fiber for amplification. In this way, consumption of the high energy level rare earth particles in both of the first optical fiber and the second optical fiber by the spontaneous emission or the amplified spontaneous emission can be reduced.

In a case in which the optical signal amplification apparatus 2 includes the plurality of optical filters 204, any one of the optical filters 204 may perform forward filtering, reverse filtering, or bidirectional filtering on the first beam in the doped optical fiber 203. The plurality of optical filters 204 may implement multi-level filtering on the first beam transmitted in the doped optical fiber 203. In a case in which the doped optical fiber 204 has a length, compared with single-level filtering for the first beam by using a single optical filter 204 in the doped optical fiber 203, the multi-level filtering for the first beam by the plurality of optical filters 204 may enable the first beam generated by the spontaneous emission to be filtered out after being transmitted for a short distance. This ensures that the first beam is not amplified to a large power and reduces consumption of the high energy level rare earth particles in the doped optical fiber 204.

The optical signal amplification apparatus described above may amplify a single signal beam (the single signal beam may include one or more single-wavelength beams). In still some implementations of the optical signal amplification apparatus provided in the embodiments, a plurality of signal beams (any one signal beam of which may include one or more single-wavelength beams) may be amplified, for example, four signal beams, six signal beams, or eight signal beams are simultaneously amplified. Details are described below.

Based on the description of the optical signal amplification apparatus corresponding to FIG. 2, further, the optical signal amplification apparatus 2 may include a plurality of doped optical fibers 203 connected in parallel, and optical filters 204 disposed between two ends of each of the doped optical fibers 203. The combiner assembly 202 of the optical signal amplification apparatus 2 includes a dichroscope. Different doped optical fibers 203 may share one dichroscope. Alternatively, different doped optical fibers 203 each have a corresponding dichroscope. The optical signal amplification apparatus 2 may further include an optical splitter 205 and a plurality of collimation lenses 206. A quantity of optical splitting paths of the optical splitter 205 may be the same as a quantity of input signal beams.

The optical splitter 205 may be configured to split a pump beam emitted by the pump light source 201 to obtain a plurality of split pump beams. Each of the collimation lens in the plurality of collimation lenses 206 is configured to collimate and transmit one split pump beam of the plurality of split pump beams to the dichroscope. The dichroscope is configured to receive the plurality of signal beams and the plurality of split pump beams passing through the collimation lens. The dichroscope is further configured to combine different pump beams in the plurality of pump beams and different signal beams in the plurality of signal beams. The dichroscope is further configured to input different combined beams into the different doped optical fibers 203. Each of the parallel doped optical fibers 203 may receive one combined beam, and then may amplify the signal beam in the combined beam under the action of the split pump beam. In addition, the optical filter 204 disposed in each of the doped optical fibers 203 may suppress amplified spontaneous emission in the doped optical fiber 203 connected to the optical filter and reduce consumption of high energy level rare earth particles in the doped optical fibers 203.

In an implementation, lengths of the doped optical fibers 203 may be the same or may be different. Further, positions of the optical filters 204 between the two ends of each of the doped optical fibers 203 may be the same or may be different. A distance between each of the optical filters 204 and the ends of the doped optical fiber 203 connected to the optical filter may be the same or may be different.

In an implementation, two side surfaces of the dichroscope may be coated with a film having a function based on different incident beams. For example, a highly reflective film for the split pump beam may be coated on a side surface on which the split pump beam is incident on the dichroscope, so that the split pump beam can be efficiently reflected into the doped optical fiber 203, thereby improving pumping efficiency of the pump light source 201. A highly transmissive film for the signal beam may be coated on a side surface on which the signal beam is incident on the dichroscope, so that the signal beam can be efficiently transmitted through the dichroscope, thereby reducing a loss of the signal beam. The side surface of the dichroscope on which the split pump beam is incident and the side surface on which the signal beam is incident may be a same side surface of the dichroscope or may be different side surfaces of the dichroscope. In some implementations, a selection of a coated film function on a side surface of the dichroscope is related to a pumping function of the pump light source 201.

Figure 7A:
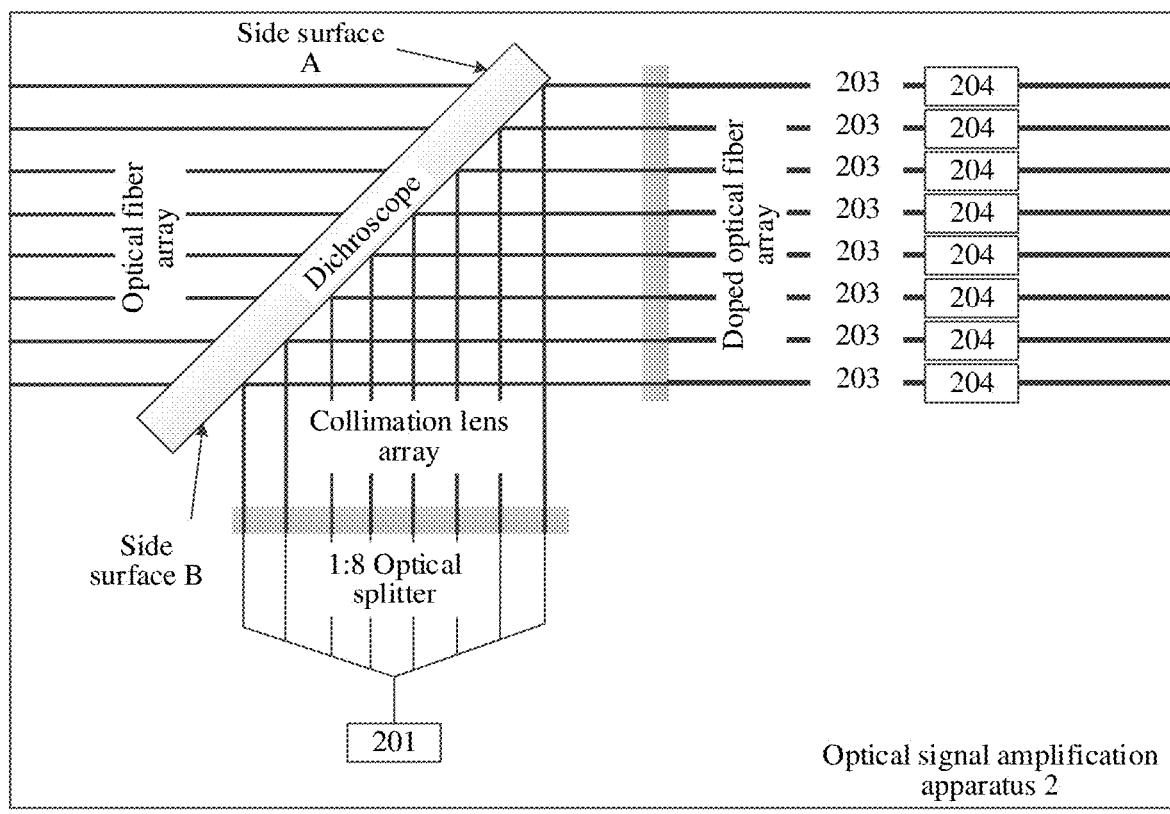
FIG. 7a is a schematic diagram of another structure of an optical signal amplification apparatus according to an embodiment.
Figure 7B:
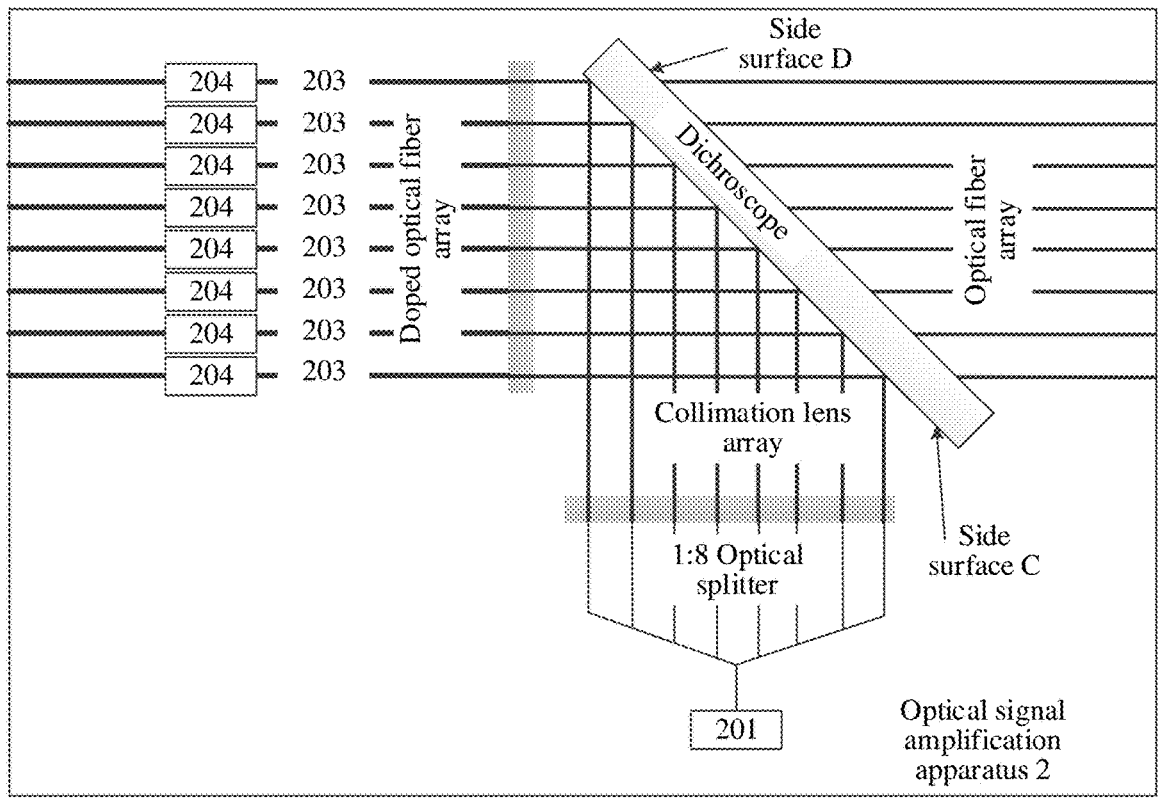
FIG. 7b is a schematic diagram of another structure of an optical signal amplification apparatus according to an embodiment.
Figure 7C:
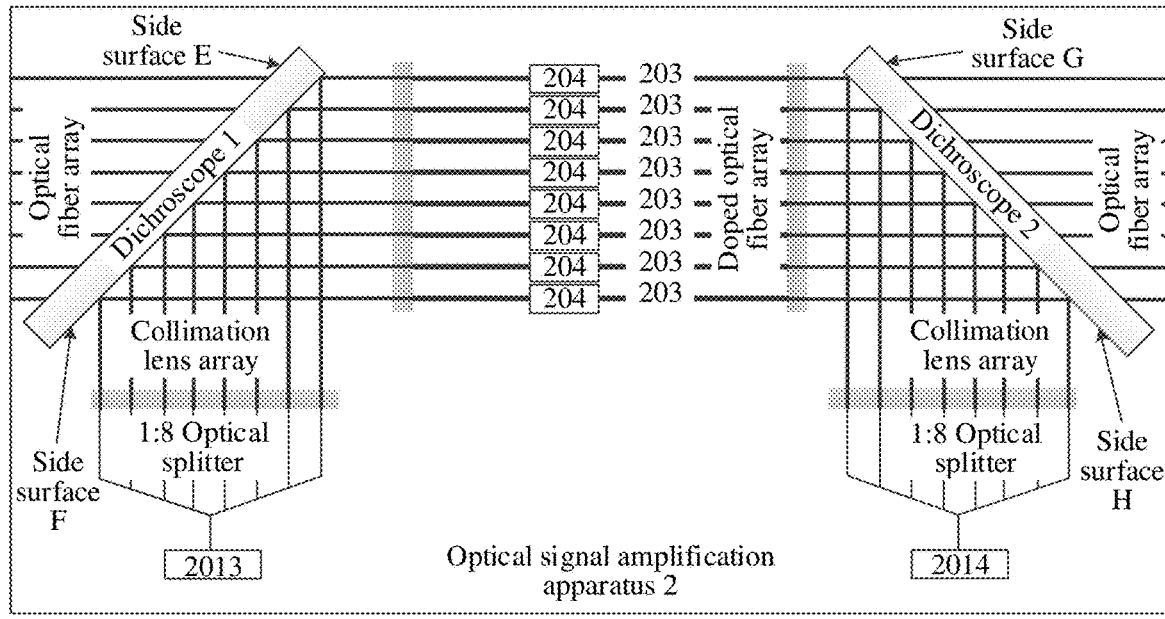
FIG. 7c is a schematic diagram of another structure of an optical signal amplification apparatus according to an embodiment.

FIG. 7*a* to FIG. 7*c* are schematic diagrams of another structure of an optical signal amplification apparatus according to an embodiment. The optical signal amplification apparatus shown in FIG. 7*a* to FIG. 7*c* may be used as an example to describe an optical signal amplification apparatus that can amplify a plurality of signal beams, and a selection of a coated film function of a side surface of a dichroscope. FIG. 7*a* to FIG. 7*c* each show an optical signal amplification apparatus 2 having a function of amplifying eight signal beams simultaneously.

The optical signal amplification apparatus 2 shown in FIG. 7*a* and FIG. 7*b* includes a doped optical fiber array. The doped optical fiber array includes eight doped optical fibers 203 connected in parallel. The eight doped optical fibers connected in parallel each may receive one signal beam. After being split by a 1:8 optical splitter, a pump beam emitted by a pump light source 201 is transmitted to a dichroscope through a collimation lens array. The collimation lens array includes eight collimation lenses. One collimation lens may collimate and transmit one split pump beam after being split to the dichroscope. The eight doped optical fibers may share one dichroscope. The dichroscope may reflect the received eight different split pump beams into the eight different doped optical fibers 203.

The optical signal amplification apparatus 2 shown in FIG. 7*a* may implement a forward pumping function on the doped optical fibers 203. In the optical signal amplification apparatus 2 shown in FIG. 7*a*, the signal beams are incident to a side surface A of the dichroscope through the optical fiber array. However, the split pump beams from the pump light source 201 are incident to a side surface B of the dichroscope. Therefore, a highly transmissive film for the signal beams may be coated on the side surface A of the dichroscope, and a highly reflective film for the split pump beams may be coated on the side surface B of the dichroscope.

The optical signal amplification apparatus 2 shown in FIG. 7*b* may implement a reverse pumping function on the doped optical fibers 203. In the optical signal amplification apparatus 2 shown in FIG. 7*b*, the signal beams are input to the doped optical fiber array and are incident to a side surface C of the dichroscope through the doped optical fiber array. In addition, the split pump beams from the pump light source 201 are also incident to the side surface C of the dichroscope. Therefore, a coated film on the side surface C of the dichroscope has a high-transmittance function for the signal beams and a high-reflection function for the split pump beams.

An optical signal amplification apparatus 2 shown in FIG. 7*c* includes a doped optical fiber array. The doped optical fiber array includes eight doped optical fibers 203 connected in parallel. The eight doped optical fibers connected in parallel each may receive one signal beam. Different from the optical signal amplification apparatus 2 shown in FIG. 7*a* or FIG. 7*b*, the optical signal amplification apparatus 2 in FIG. 7*c* includes two pump light sources: a pump light source 2013 and a pump light source 2014, which can implement a bidirectional pumping function on the doped optical fibers 203. The pump light source 2013 and the pump light source 2014 each have a corresponding 1:8 optical splitter and a corresponding collimation lens array. A pump beam emitted by the pump light source 2013 that performs forward pumping is split by the 1:8 optical splitter, and then transmitted to a dichroscope 1 through the collimation lens array. A pump beam emitted by the pump light source 2014 that performs reverse pumping is split by the 1:8 optical splitter, and then transmitted to a dichroscope 2 through the collimation lens array. The signal beams are incident to a side surface E of the dichroscope 1 through the optical fiber array. However, the split pump beams from the pump light source 2013 are incident to a side surface F of the dichroscope 1. Therefore, a highly transmissive film for the signal beams may be coated on the side surface E of the dichroscope 1, and a highly reflective film for the split pump beams may be coated on the side surface F of the dichroscope 1. After passing through the doped optical fiber array, the signal beams are incident to a side surface H of the dichroscope 2. In addition, the split pump beams from the pump light source 2014 are also incident to the side surface H of the dichroscope 2. Therefore, a coated film on the side surface H of the dichroscope 2 may have a high-transmittance function for the signal beams and a high-reflection function for the split pump beams.

It should be understood that another optical signal may further pass through the optical signal amplification apparatus 2, and a selection of a coated film function on the side surface of the dichroscope is further related to a wavelength of another optical signal that may pass through. For example, in the optical signal amplification apparatus 2 shown in FIG. 7c, if the erbium-doped fiber 203 has a monitoring optical signal transmitted in a direction from the dichroscope 1 to the dichroscope 2, the coated film of the side surface E of the dichroscope 1 and the side surface H of the dichroscope 2 both have a high-transmissive function for the monitoring optical signal.

In an optical signal amplification apparatus, a combiner assembly is an optical multiplexer. The optical multiplexer has an insertion loss of 1 dB for a beam. A pump light source may implement forward pumping on a doped optical fiber. The pump light source is a single-mode pump light source, with a pump wavelength of 974 nm and a pump power of 80 mW. The doped optical fiber is an erbium-doped fiber. A total length of the erbium-doped fiber is 4.8 m. The doped optical fiber includes a first optical fiber with a length of 1.8 m that is connected between the optical multiplexer and an optical filter, and a second optical fiber with a length of 3 m that is connected between the optical filter and a signal beam output port. The optical filter is a band-stop filter. A filtering spectrum of the band-stop filter is the filtering spectrum shown in FIG. 4. The band-stop filter has an insertion loss of 0.9 dB for a beam. If a signal beam includes both a downlink signal of a GPON system and a downlink signal of an XGPON system and includes a beam of 1490 nm wavelength with a power of −4 dBm and a beam of 1577 nm wavelength with a power of −10.45 dBm, a beam output by the optical signal amplification apparatus includes a beam of 1490 nm wavelength with a power of +6.07 dBm and a beam of 1570 nm wavelength with a power of +9.3 dBm. This implements a Class D standard (the downlink signal of the GPON system may range from +6 dBm to +10 dBm (including endpoints), and the downlink signal of the XGPON system ranges from +8 dBm to +12 dBm (including endpoints)) output of the downlink signals of the GPON system and the XGPON system.

In another optical signal amplification apparatus, a combiner assembly is an optical multiplexer. The optical multiplexer has an insertion loss of 1 dB for a beam. A pump light source may implement forward and reverse pumping on a doped optical fiber. The pump light source is a single-mode pump light source, with a pump wavelength of 974 nm and a pump power of 80 mW. The doped optical fiber is an erbium-doped fiber. A total length of the erbium-doped fiber is 4.9 m. The doped optical fiber includes a first optical fiber with a length of 2.3 m that is connected between a signal beam input port and an optical filter, and a second optical fiber with a length of 2.6 m that is connected between the optical filter and the optical multiplexer. The optical filter is a band-stop filter. A filtering spectrum of the band-stop filter is the filtering spectrum shown in FIG. 4. The band-stop filter has an insertion loss of 0.9 dB for a beam. If a signal beam includes both a downlink signal of a GPON system and a downlink signal of an XGPON system and includes a beam of 1490 nm wavelength with a power of −4 dBm and a beam of 1577 nm wavelength with a power of −10 dBm, a beam output by the optical signal amplification apparatus includes a beam of 1490 nm wavelength with a power of +6.07 dBm and a beam of 1570 nm wavelength with a power of +9.1 dBm. This implements a Class D standard output of the downlink signals of the GPON system and the XGPON system.

Figure 8:
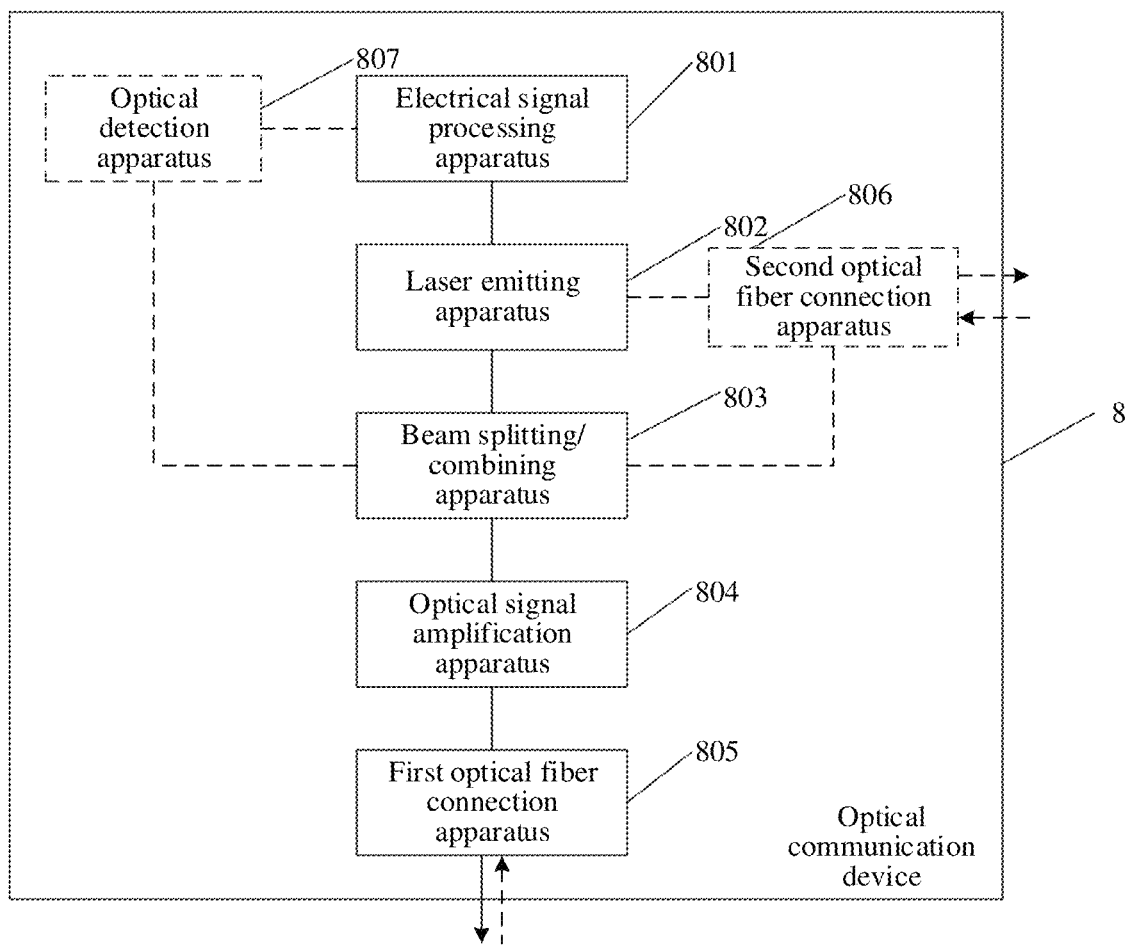
FIG. 8 is a schematic diagram of a structure of an optical communication device according to an embodiment.

The embodiments may further provides an optical communication device. FIG. 8 is a schematic diagram of a structure of an optical communication device according to an embodiment. As shown in FIG. 8, the optical communication device 8 includes an electrical signal processing apparatus 801, a laser emitting apparatus 802, a beam splitting/combining apparatus 803, an optical signal amplification apparatus 804, and a first optical fiber connection apparatus 805.

The electrical signal processing apparatus 801 is configured to generate a first electrical signal. The first electrical signal carries first service information. The laser emitting apparatus 802 is configured to emit a plurality of single-wavelength beams of different wavelengths based on the first electrical signal. Each of the single-wavelength beams carries a part or all of service information in the first service information. The beam splitting/combining apparatus 803 is configured to combine the plurality of single-wavelength beams of different wavelengths emitted by the laser emitting apparatus 802 into a signal beam. The optical signal amplification apparatus 804 is configured to amplify the signal beam. The first optical fiber connection apparatus 805 is configured to output the signal beam amplified by the optical signal amplification apparatus 804.

In an implementation, the electrical signal processing apparatus 801 may be configured to receive a first electrical signal that carries the first service information. For example, if the optical communication device 8 is an OLT device deployed in a central equipment room of an optical network system, the first electrical signal may be a downlink electrical signal from an aggregation switch, and the first service information carried in the first electrical signal may be downlink service information of a user.

In another implementation, the optical communication device 8 may further include a second optical fiber connection apparatus 806 and an optical detection apparatus 807. The second optical fiber connection apparatus 806 may be configured to receive a beam from an outside of the optical communication device 8, and/or configured to output a beam to the outside of the optical communication device 8. In an example, the second optical fiber connection apparatus 806 may be configured to receive a first optical signal. The first optical signal carries second service information. The optical detection apparatus 807 may be configured to process the first optical signal into a second electrical signal. The second electrical signal carries the second service information. The electrical signal processing apparatus 801 may be configured to perform electrical signal processing on the second electrical signal output by the optical detection apparatus 807, so as to obtain the first electrical signal that carries the first service information. In an implementation, the first service information may include a part of service information in the second service information. For example, the second service information is broadcast service information, and the electrical signal processing apparatus 801 may extract required first service information. The electrical signal processing apparatus 801 may also perform other processing on the second electrical signal. A processing manner is not limited herein. In another example, the second optical fiber connection apparatus 806 may output a third optical signal to the outside of the optical communication device 8, output a single-wavelength beam processed by the optical beam splitting/combining apparatus 803, or the like. An implementation is described in the following.

In still another implementation, the electrical signal processing apparatus 801 may be configured to receive a third electrical signal that carries third service information. The electrical signal processing apparatus 801 may process the third electrical signal to obtain the first electrical signal that carries the first service information. For example, the first service information may include some service information in the third service information.

The electrical signal processing apparatus 801 may include one or more processors. The processor may be a central processing unit (CPU), and may alternatively be a digital signal processor (DSP), an application specific integrated circuit (ASIC), or the like, so that the processor generates the first electrical signal that carries the first service information.

The first service information may include multiple channels of different service information. The laser emitting apparatus 802 may include one or more laser devices. Each of the laser devices may modulate some of service information or all of the service information in the first service information into a laser beam of a specified wavelength based on the first electrical signal. For example, in an onboard integrated OLT of a GPON system and an XGPON system, the laser emitting apparatus 802 may include a plurality of laser devices that emit a beam of 1490 nm and/or 1577 nm wavelength. The laser device emitting the beam of 1490 nm wavelength may modulate service information that is in the first service information and that is sent to a downstream device of the GPON system into a laser beam of 1490 nm wavelength. The laser device emitting the beam of 1577 nm wavelength may modulate service information that is in the first service information and that is sent to a downstream device of the XGPON system into a laser beam of 1577 nm wavelength.

The beam splitting/combining apparatus 803 may include one or more components such as an optical coupler, an optical multiplexer, or a dichroscope, and may combine the single-wavelength beams of different wavelengths emitted by the laser emitting apparatus 802 into the signal beam.

The optical signal amplification apparatus 804 may be any optical signal amplification apparatus provided in the foregoing embodiments. There may be one or more optical signal amplification apparatuses 804 in the optical communication device 8. Because the optical signal amplification apparatus provided in the embodiments has relatively high utilization for a pump beam, a received pump beam may be fully used to amplify the signal beam. Because a pump light source has relatively high pumping efficiency, in a case in which the optical communication device 8 includes a plurality of optical signal amplification apparatuses 804, the plurality of optical signal amplification apparatuses 804 may share one high-power single-mode pump light source, to implement a high-power amplification output for a plurality of signal beams under a pumping function of one high-power single-mode pump light source.

The first optical fiber connection apparatus 805 may include one or more MPOs (Multi-fiber Push On connectors, multi-fiber push on connectors) and the like.

In some other implementations, the first optical fiber connection apparatus 805 may be configured to output an optical signal to the outside of the optical communication device 8, for example, configured to output the amplified signal beam. The first optical fiber connection apparatus 805 may be further configured to receive an input optical signal from the outside of the optical communication device 8. For example, the first optical fiber connection apparatus 805 is further configured to receive a second optical signal. The second optical signal includes one or more single-wavelength beams. Each of the single-wavelength beams may carry different fourth service information. The optical signal received by the first optical fiber connection apparatus 805 and the optical signal output by the first optical fiber connection apparatus 805 may be optical signals in opposite transmission directions. For example, a downlink optical signal is output, and an uplink optical signal is received.

In this implementation, the optical signal amplification apparatus 804 is further configured to transmit the second optical signal to the beam splitting/combining apparatus 803. The optical signal amplification apparatus 804 may also amplify the second optical signal in a process of transmitting the second optical signal. The beam splitting/combining apparatus 803 is further configured to process the second optical signal into a single-wavelength beam.

In an implementation, the single-wavelength beam processed by the beam splitting/combining apparatus 803 may be output by the second optical fiber connection apparatus 806.

In another implementation, the optical detection apparatus 807 may process the single-wavelength beam obtained by the beam splitting/combining apparatus 803 into a fourth electrical signal. The fourth electrical signal carries the fourth service information. The electrical signal processing apparatus 801 is further configured to process the fourth electrical signal to obtain a fifth electrical signal. The fifth electrical signal carries fifth service information. For example, the fifth service information may include the fourth service information of each of the single-wavelength beams in the second optical signal.

Further, the electrical signal processing apparatus 801 may output the fifth electrical signal. Alternatively, the laser emitting apparatus 802 may be further configured to emit a third optical signal based on the fifth electrical signal. The third optical signal carries the fifth service information. The second optical fiber connection apparatus 806 may be further configured to output the third optical signal.

Figure 9:
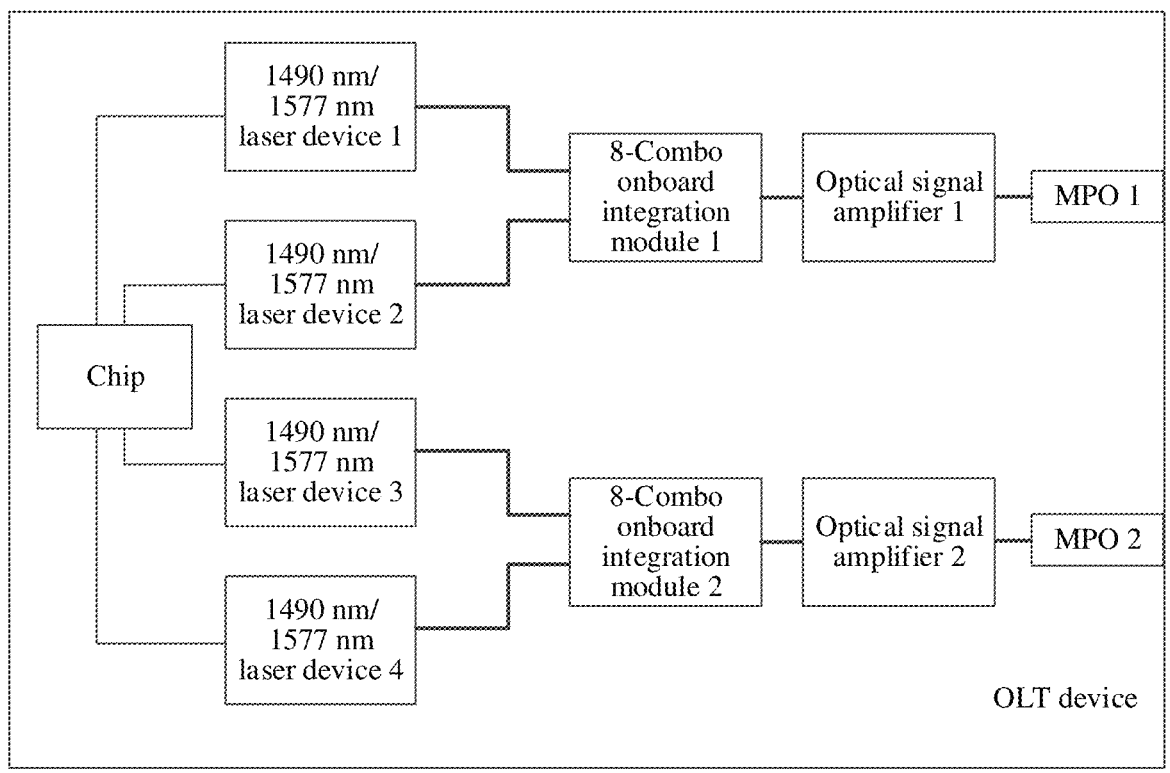
FIG. 9 is a schematic diagram of a structure of an OLT device according to an embodiment.

FIG. 9 is a schematic diagram of a structure of an OLT device according to an embodiment. With reference to apparatuses included in the optical communication device 8 shown in FIG. 8, the OLT device shown in FIG. 9 is described. A chip in the OLT device shown in FIG. 9 may be used as the electrical signal processing apparatus 801 and is configured to generate a first electrical signal. The laser emitting apparatus 802 includes four laser devices: a 1490 nm/1577 nm laser device 1 to a 1490 nm/1577 nm laser device 4. Each of the foregoing laser devices may emit four beams based on the first electrical signal. The beam splitting/combining apparatus 803 includes two onboard integration modules: an 8-Combo onboard integration module 1 and an 8-Combo onboard integration module 2. Each of the foregoing onboard integration modules may combine four beams received from each of the two laser devices into a signal beam. The optical signal amplification apparatus 804 includes two optical signal amplifiers: an optical signal amplifier 1 and an optical signal amplifier 2. Each of the optical signal amplifiers may amplify a signal beam received from the onboard integration module. The first optical fiber connection apparatus 805 includes two MPO panels: an MPO 1 and an MPO 2. Each of the MPO panels may output an amplified signal beam received from a corresponding optical signal amplifier. In an implementation, more onboard integration technologies may be combined into the OLT device based on an SFP (small form-factor pluggable, small form-factor pluggable) technology, to implement conversion, amplification, and output of more electrical signals.

In the descriptions of the embodiments, "/" means "or" unless otherwise specified. For example, A/B may represent A or B. Additionally, "and/or" describes only an association relationship between associated objects and represents that three relationships may exist. For example, A and/or B may represent the following three cases: only A exists, both A and B exist, and only B exists. In addition, in the descriptions in the embodiments, "a plurality of" means two or more.

In the embodiments and the accompanying drawings, terms "first", "second", "third", "fourth" and so on are intended to distinguish between different objects but do not indicate a particular order. In addition, the terms "including" and "having," and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Persons of ordinary skill in the art may understand that sequence numbers of the foregoing processes do not mean execution sequences in the various embodiments. The execution sequences of the processes should be determined according to functions and internal logic of the processes and should not be construed as any limitation on the embodiments.

What is claimed is:

1. An optical signal amplification apparatus, comprising:
a pump light source, wherein the pump light source is configured to emit a pump beam;
a combiner assembly, wherein the combiner assembly is configured to combine a signal beam and the pump beam that are received and couple a combined beam into a plurality of doped optical fibers;
the plurality of doped optical fibers connected in parallel, wherein and each of the doped optical fibers are configured to amplify the signal beam under excitation by the pump beam;
an optical filter disposed between two ends of each of the doped optical fibers:
an optical splitter configured to split the pump beam to obtain a plurality of split pump beams; and
a plurality of collimation lenses configured to collimate and transmit one pump beam of the plurality of split pump beams to the combiner assembly, wherein
the signal beam comprises one or more single-wavelength signals, the optical filter is disposed between two ends of the doped optical fiber, the optical filter is configured to transmit the signal beam in the doped optical fiber and is configured to filter out a first beam in the doped optical fiber, and the first beam comprises a beam of some wavelengths or a beam of all wavelengths generated by spontaneous emission in the doped optical fiber.

2. The optical signal amplification apparatus according to claim 1, wherein the optical filter is a long-period fiber grating inscribed at any position between the two ends of the doped optical fiber.

3. The optical signal amplification apparatus according to claim 1, further comprising:
a plurality of optical filters disposed at different positions between the two ends of the doped optical fiber.

4. The optical signal amplification apparatus according to claim 1, wherein the doped optical fiber further comprises:
a first optical fiber and a second optical fiber that are respectively located on two sides of the optical filter; and
the optical filter is configured to filter out a part of beam in the first beam that is transmitted from the first optical fiber to the second optical fiber, and/or is configured to filter out a part of beam in the first beam that is transmitted from the second optical fiber to the first optical fiber.

5. The optical signal amplification apparatus according to claim 1, wherein the doped optical fiber is an erbium-doped fiber, and a stopband frequency of the optical filter comprises a frequency of a beam with a wavelength of 1530 nm.

6. The optical signal amplification apparatus according to claim 5, wherein the signal beam comprises at least a beam with a wavelength of 1490 nm and a beam with a wavelength of 1577 nm, and an inversion rate of erbium ions in the erbium-doped fiber is greater than 70%.

7. The optical signal amplification apparatus according to claim 1,
wherein, the combiner assembly comprises a dichroscope; and
the dichroscope is configured to receive a plurality of signal beams and the plurality of split pump beams passing through the plurality of collimation lenses, is further configured to combine different pump beams of the plurality of pump beams with different signal beams of the plurality of signal beams and is further configured to input different beams after the combination into the different doped optical fibers.

8. An optical communication device, comprising:
an electrical signal processing apparatus, wherein the electrical signal processing apparatus is configured to generate a first electrical signal that carries first service information;
a laser emitting apparatus, wherein the laser emitting apparatus is configured to emit a plurality of single-wavelength beams of different wavelengths based on the first electrical signal, and each of the single-wavelength beams carries a part or all of service information in the first service information;
a beam splitting/combining apparatus, wherein the beam splitting/combining apparatus is configured to combine the plurality of single-wavelength beams of different wavelengths into a signal beam;

an optical signal amplification apparatus, wherein the optical signal amplification apparatus comprises a pump light source, a combiner assembly, a plurality of doped optical fibers connected in parallel, a plurality of collimation lenses, an optical splitter, and an optical filter; and a first optical fiber connection apparatus, wherein the optical signal amplification apparatus is configured to amplify the signal beam, the pump light source is configured to emit a pump beam, the combiner assembly is configured to combine the signal beam and the pump beam that are received, and couple a combined beam into the doped optical fiber, the doped optical fiber is configured to amplify the signal beam under excitation by the pump beam, and the signal beam comprises one or more single-wavelength signals;

the optical splitter is configured to split the pump beam to obtain a plurality of split pump beams;

the plurality of collimation lenses is configured to collimate and transmit one pump beam of the plurality of split pump beams to the combiner assembly; and the optical filter is disposed between two ends of each of the doped optical fibers, the optical filter is configured to transmit the signal beam in the doped optical fiber and is configured to filter out a first beam in the doped optical fiber, and the first beam comprises a beam of some wavelengths or a beam of all wavelengths generated by spontaneous emission in the doped optical fiber; and the first optical fiber connection apparatus is configured to output the signal beam amplified by the optical signal amplification apparatus.

9. The optical communication device according to claim 8, wherein the optical filter is a long-period fiber grating inscribed at any position between the two ends of the doped optical fiber.

10. The optical communication device according to claim 8, wherein the optical signal amplification apparatus further comprises:

a plurality of optical filters disposed at different positions between the two ends of the doped optical fiber.

11. The optical communication device according to claim 8, wherein the doped optical fiber comprises a first optical fiber and a second optical fiber that are respectively located on two sides of the optical filter; and the optical filter is configured to filter out a part of beam in the first beam that is transmitted from the first optical fiber to the second optical fiber, and/or is configured to filter out a part of beam in the first beam that is transmitted from the second optical fiber to the first optical fiber.

12. The optical communication device according to claim 8, wherein the doped optical fiber is an erbium-doped fiber, and a stopband frequency of the optical filter comprises a frequency of a beam with a wavelength of 1530 nm.

13. The optical communication device according to claim 12, wherein the signal beam comprises at least a beam with a wavelength of 1490 nm and a beam with a wavelength of 1577 nm, and an inversion rate of erbium ions in the erbium-doped fiber is greater than 70%.

14. The optical communication device according to claim 8, wherein, the combiner assembly comprises a dichroscope; and the dichroscope is configured to receive a plurality of signal beams and the plurality of split pump beams passing through the plurality of collimation lenses, is further configured to combine different pump beams of the plurality of pump beams with different signal beams of the plurality of signal beams and is further configured to input different beams after the combination into the different doped optical fibers.

* * * * *